United States Patent
Nakajima et al.

(10) Patent No.: US 6,678,724 B2
(45) Date of Patent: Jan. 13, 2004

(54) COMMON NAMESPACE FOR INTERNET AND LOCAL FILESYSTEM OBJECTS

(75) Inventors: Satoshi Nakajima, Redmond, WA (US); Joseph D. Belfiore, Redmond, WA (US); Christopher J. Guzak, Kirkland, WA (US); Chee H. Chew, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 10/208,228

(22) Filed: Jul. 30, 2002

(65) Prior Publication Data

US 2002/0188758 A1 Dec. 12, 2002

Related U.S. Application Data

(63) Continuation of application No. 08/816,449, filed on Mar. 12, 1997, now abandoned.

(51) Int. Cl.[7] .............................................. G06F 15/16
(52) U.S. Cl. ...................................................... 709/219
(58) Field of Search ................................ 709/217–219, 709/204, 227–229, 250; 707/1, 2, 4, 10, 200; 702/9; 345/179

(56) References Cited

U.S. PATENT DOCUMENTS

| | | | | |
|---|---|---|---|---|
| 5,001,628 A | * | 3/1991 | Johnson et al. ................ 707/10 |
| 5,561,799 A | * | 10/1996 | Khalidi et al. ............... 707/200 |
| 5,579,481 A | * | 11/1996 | Drerup ........................ 345/179 |
| 5,623,666 A | * | 4/1997 | Pike et al. ................... 707/200 |
| 5,732,219 A | * | 3/1998 | Blumer et al. ................ 709/227 |
| 5,764,972 A | * | 6/1998 | Crouse et al. .................. 707/1 |
| 5,801,702 A | * | 9/1998 | Dolan et al. ................. 345/357 |
| 5,838,910 A | * | 11/1998 | Domenikos et al. ......... 709/203 |
| 5,848,410 A | * | 12/1998 | Walls et al. .................... 707/4 |
| 5,864,772 A | * | 1/1999 | Alvarado et al. ............... 702/9 |
| 5,892,908 A | * | 4/1999 | Hughes et al. .............. 709/250 |
| 5,915,038 A | * | 6/1999 | Abdel-Mottaleb et al. ... 382/209 |
| 6,064,671 A | * | 5/2000 | Killian ........................ 370/389 |
| 6,078,929 A | * | 6/2000 | Rao ........................... 707/200 |
| 6,105,028 A | * | 8/2000 | Sullivan et al. ............... 707/10 |
| 6,119,151 A | * | 9/2000 | Cantrell et al. ............. 709/216 |

OTHER PUBLICATIONS

Charlotte: Metacomputing on the Web—Baratloo (1996); cs.nyu.edu/kedem/pubs/pdcs96.ps.*

Measuring the Impact of Event Dispatching and Concurrency Models . . . —James Hu (1997); siesta.cs.wustl.edu/~schmidt/globalinternet.ps.gz.*

* cited by examiner

Primary Examiner—Mark R. Powell
Assistant Examiner—Thong Vu
(74) Attorney, Agent, or Firm—Banner & Witcoff, Ltd.

(57) ABSTRACT

The present invention provides a common namespace for Internet and local filesystem objects. In a preferred embodiment, the common namespaces constructed by first accessing a namespace definition table. The namespace definition table contains entries referencing both a filesystem namespace subtree definition module and an Internet namespace subtree definition module. The entry referencing the filesystem namespace subtree definition module is used to access the filesystem namespace subtree definition module in order to define a filesystem namespace subtree that encompasses filesystem addresses. Similarly, the entry referencing the Internet namespace subtree definition module is used to access the Internet namespace subtree definition module to define an Internet namespace subtree that encompasses Internet addresses. The defined filesystem and Internet namespace subtrees are then combined in order to assemble a namespace encompassing both filesystem addresses and Internet addresses.

37 Claims, 12 Drawing Sheets

Shell Extension Table

| Name | Icon | p I Shell Folder |
|---|---|---|
| My Computer<br>Network Neighborhood<br>Recycle Bin<br>Internet | | |

— 500

COMMON NAMESPACE FOR INTERNET AND LOCAL FILESYSTEM OBJECTS

TECHNICAL FIELD

The invention relates generally to the field of operating system design, and, more specifically, to the field of file object namespaces.

BACKGROUND OF THE INVENTION

The world wide web ("the web") is a very large body of information maintained on thousands of computer systems connected by the Internet. The web is organized into millions of documents called web pages. A group of related web pages produced and maintained by the same person or organization is known as a "web site."

A user typically interacts with the web using an application program known as a web browser or web client executing on the user's computer system, or the "client" computer system. Each web page may be independently accessed by providing a reference to the web page, called a "URL," or "uniform resource locator," to the web browser application. The web browser application uses the URL to retrieve the contents of the web page via the Internet, then displays those contents in a window displayed by the web browser application. Web page contents can include data such as text, still images, and audio and video clips; programs executable on the client machine; and links to related web pages.

Conventional web browsers operate in a manner completely distinct from the filesystem viewers typically provided by operating systems and user interface shells. For example, FIG. 1 is a screen diagram showing a window displayed by a filesystem viewer application called the Windows Explorer provided with a Microsoft® Windows® 95 operating system and user interface shell. The window 100 contains a subwindow 110 whose contents describe the contents of a filesystem directory. The contents of the subwindow show that the current directory contains two file folders, "Drivers" and "Icu", as well as an MS-DOS Application "Readme" and a Text Document "Readme". The user may further use the filesystem viewer application to issue commands to manipulate the contents of the displayed directory, such as commands to move, rename, delete, or launch files in the directory and create new folders or files in the directory.

In contrast, FIG. 2 shows the contents of the same directory displayed by a conventional web browser application. Window 201 is displayed by the conventional web browser application, and contains subwindow 220. It can be seen that the contents of this subwindow have a significantly different visual appearance from the contents of subwindow 110 (FIG. 1). For example, the subwindow displayed by the web browser uses icons, such as icons 221 and 222, that differ from the icons used by the file viewer application, such as icons 111 and 112. The web browser application further uses different labels to characterize the types of each object contained in the directory, 225F–228 than the labels used by the filesystem viewer, 115–118 (FIG. 1). Finally, the web browser displays different file sizes, 223 and 224 than the filesystem viewer, 113 and 114 (FIG. 1), for the same objects. Even further, the web browser displays a directory label 229 and a parent directory link 230 not displayed by the file viewer application. Additionally, the web browser application does not allow the user to issue commands to manipulate the contents of the displayed directory. Such differences in the operation of the web browser to display the contents of a filesystem directory from the filesystem viewer make it difficult for a user to use both applications.

Further, Internet addresses, such as those used in URLs to identify web pages, are completely distinct from the shell hierarchy used in most user interface shells and operating systems to represent the contents of a local filesystem, as well as other resources available from or through the user's computer system. The emission of these addresses from the hierarchy makes it difficult for users to switch back and forth between objects stored in the hierarchy and objects stored at Internet addresses.

SUMMARY OF THE INVENTION

The present invention is directed to integrating web addresses into a shell hierarchy of resources including the local filesystem, so that both web addresses and local filesystem locations can be specified as locations within the shell hierarchy. A unified web/filesystem browser application displays the shell hierarchy including both web addresses and local filesystem locations. When the user selects an item in the displayed shell hierarchy, the type of the selected item is used to select from the registry a file viewer module for displaying the selected item, whether the item is a word processing document, a filesystem directory, a web page, or a document of another type. In a further embodiment of the invention, a web browser that itself displays web pages is adapted to display the contents of a folder by calling the same code for displaying the contents of a folder as a dedicated application, provided by the user interface shell, for viewing directory contents.

DETAILED DESCRIPTION OF THE INVENTION

The present invention provides a common namespace for identifying both local and network filesystem addresses and Internet addresses. This common namespace is preferably provided as part of a shell resource hierarchy ("shell hierarchy"), which hierarchically organizes many of the resources available on or via the local computer system. Local filesystem addresses, network filesystem addresses, and Internet addresses are each represented in a subtree of the shell hierarchy. These subtrees are each generated for the Microsoft® Windows® 95 operating system by constructing an implementation of two functional interfaces, IShellFolder and IShellView whose definitions are widely available. As is described in more detail below, the IShellFolder interface is made up of functions, or "methods," for defining the contents of any folder in the respective subtree, thereby interpreting the meaning of addresses within the subtree, while the IShellView interface is made up of methods for generating a display of the contents of any folder in the respective subtree.

The common namespace may be used by the user to identify a filesystem or Internet address in several ways, including typing or otherwise entering the address textually, selecting an address from a tree-style representation of the shell hierarchy, or selecting a uniform reference, or "shortcut," to the address. When the user selects an address from the common namespace in any of these ways, a universal browser application ("the browser") preferably utilizes a universal document viewer to display the document or other object occurring at that filesystem or Internet address. The universal viewer preferably utilizes separate display modules for each of a number of different document types, including web pages, directories, and more traditional documents, such as text documents, word processing documents, and spreadsheet documents.

In a further embodiment of the invention, a further browser application capable of retrieving and displaying the contents of web pages can also display the contents of filesystem directories ("directories," or "folders"), and does so by executing the same code as an application program dedicated to displaying the contents of directories. Each of these aspects of the invention is discussed in more detail below.

Figure 3:
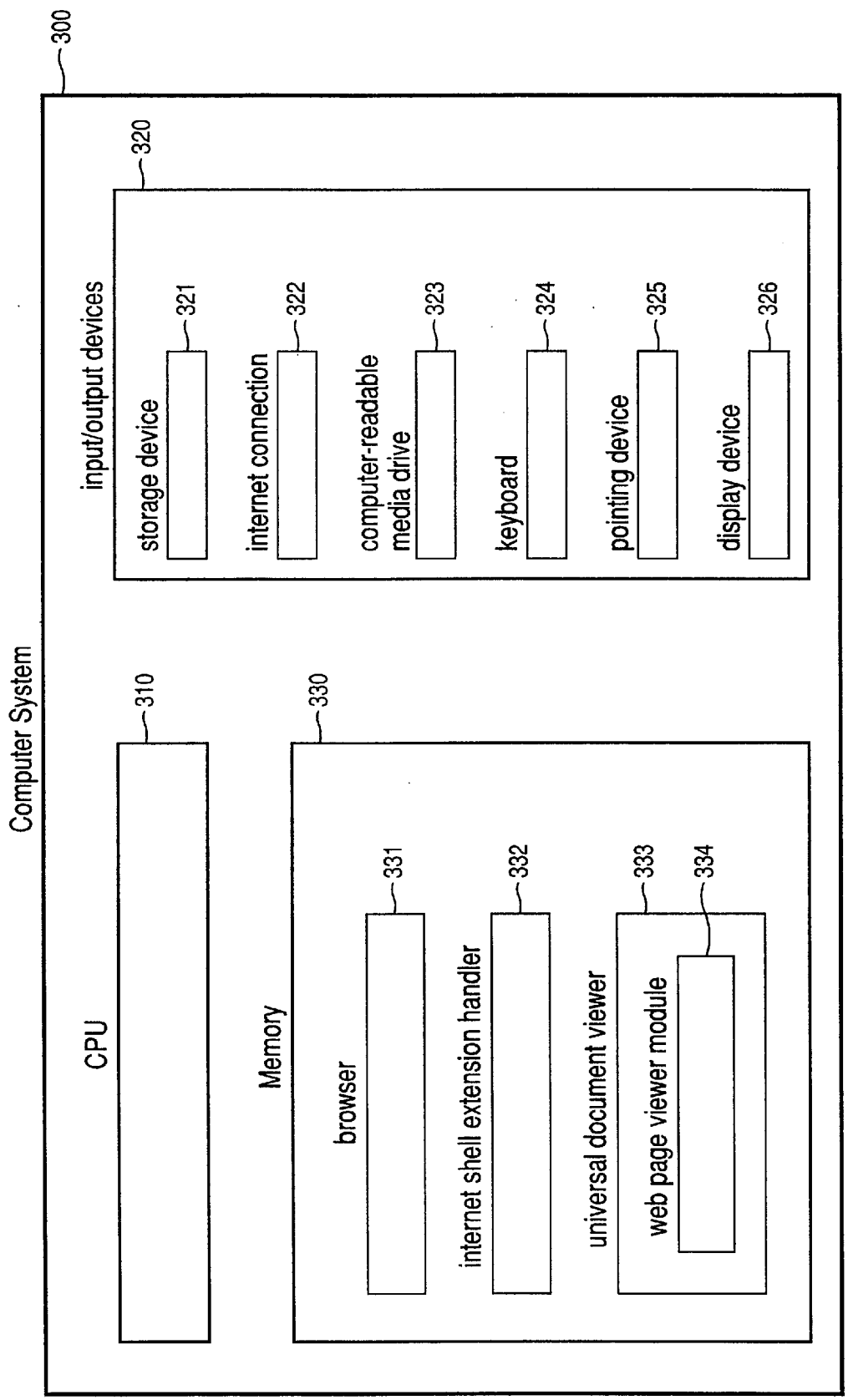
FIG. 3 is a high-level block diagram of the general-purpose computer system upon which the facility preferably executes.

FIG. 3 is a high-level block diagram of the general-purpose computer system upon which the facility preferably executes. The computer system 300 contains a central processing unit (CPU) 310, input/output devices 320, and a computer memory (memory) 330. Among the input/output devices is a storage device 321, such as a hard disk drive; an Internet connection 322 for connecting to other computers via the Internet, such as a persistent network connection or an intermittent modem connection; a computer-readable media drive 323, which can be used to install software products, including the facility, which are provided on a computer-readable medium, such as a CD-ROM; a keyboard 324 for inputting text; a pointing device 325, such as a mouse, for selecting locations; and a display device 326, such as a video monitor, for displaying visual information such as windows and their contents. The memory 330 preferably contains components designed to provide the common namespace and universal document viewer of the invention: a browser 331 that displays the contents of both filesystem and web addresses in accordance with the common namespace, an Internet shell extension handler 332 that provides support for the Internet subtree of the common namespace, a universal document viewer 333 used by the browser to display the contents of a requested address, including contents in a variety of types, and a web page viewer module 334 used by the universal document viewer to display the contents of web pages. The use of and interrelation between these components is described in greater detail below. While the facility is preferably implemented on a computer system configured as described above, those skilled in the art will recognize that it may also be implemented on computer systems having different configurations.

Figures 4, 5:
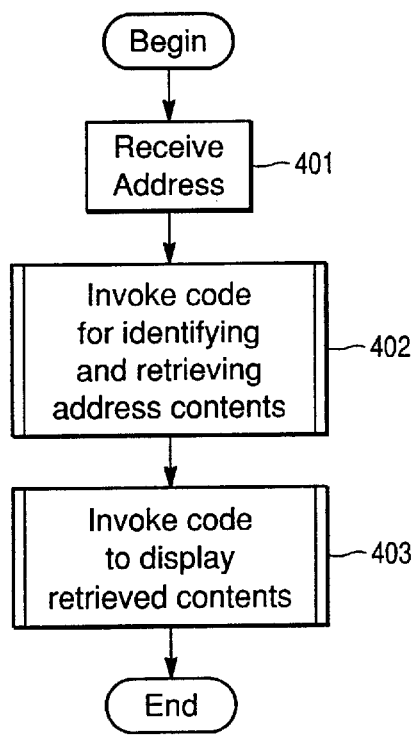
FIG. 4 is a high-level flow diagram showing the steps preferably performed by the universal browser in order to display the contents at any address within the common namespace.
FIG. 5 is a data structure diagram showing a simplified shell extension table for defining the subtrees included in the common namespace.

FIG. 4 is a high-level flow diagram showing the steps preferably performed by the universal browser in order to display the contents at any address within the common namespace. This process is also known as dereferencing an address in the common namespace. The implementation of these steps is discussed with respect to the Microsoft® Windows® 95 operating system. Those skilled in the art will recognize, however, that similar implementations using other operating systems and/or user interface shells are possible. In step 401, the browser receives the address, which may be either a filesystem address, an Internet address, or an address of another type embraced by the namespace. This address may be selected by the user, for example, by entering the address textually, selecting the address from a tree-style representation of the shell hierarchy, or selecting a shortcut to the address.

In step 402, the browser invokes code for identifying and retrieving the contents of the addresses received in step 401. In order to identify the contents of the address, the browser preferably begins at the root of the shell hierarchy. The browser first obtains a pointer to an implementation of the IShellFolder interface provided with Windows® 95 for the root of the shell hierarchy by calling a SHGetShellDesktop Windows® 95 API. The browser then uses this interface pointer to invoke a ParseDisplayName method of the implementation of the IShellFolder interface for the folder at the root of the shell hierarchy, passing the ParseDisplayName method address received in step 401. The implementation of the ParseDisplayName method for the root folder of the shell hierarchy in turn uses a list of interface pointers to the implementations of the IShellFolder interface for the subtrees of the shell hierarchy, including implementations of the IShellFolder interface corresponding to the local filesystem and the Internet.

FIG. 5 is a data structure diagram showing a simplified shell extension table for defining the subtrees included in the common namespace. In the Microsoft® Windows® 95 implementation, this data is preferably stored as data keys in a system-wide registry. Details of this registry are omitted from the shell extension table, however, in order to more straightforwardly discuss the provision and use of this information in the context of the invention. The shell extension table 500 preferably contains an entry for each subtree within the common namespace. For example, it contains a "my computer" entry for a local filesystem subtree, a "network neighborhood" entry for a distributed filesystem namespace, a "recycle bin" entry for a subtree containing deleted objects that are still recoverable, and an "internet" entry representing the Internet subtree. For each entry, the shell extension table contains data representing the icon displayed for each of the namespace subtrees, or a pointer thereto. The shell extension table further contains, for each entry, a pointer to the implementation of the IShellFolder interface for the local root folder of the namespace subtree. This interface pointer may be used to invoke methods on the implementation of the IShellFolder interface of the top object in each subtree as part of the process of browsing an address in that subtree. In a preferred embodiment, shell folder objects implementing the IShellFolder interface for these subtrees are only instantiated as needed, and an interface pointer for the objects may not always be available. In this case, the shell extension table contains information for instantiating an instance of the shell folder object for each namespace subtree instead of an interface pointer to an already-instantiated shell folder object for the subtree.

Each of the ParseDisplayName method of the namespace subtree objects determines whether the address is consistent with addresses in its subtree. For example, implementation for the filesystem shell folder object would determine that the address "c:\plugplay" is consistent with addresses in its subtree, while the address "http://www.microsoft.com" is not consistent with addresses in its subtree. Inversely, the implementation of the ParseDisplayName method for the Internet shell folder object will determine that the address "http://www.microsoft.com" is consistent with addresses in its subtree, while the address "c:\plugplay" is not. If a subtree object implementation of the ParseDisplayName method determines that the address is inconsistent with addresses in its subtree, then the shell hierarchy root implementation proceeds to invoke the implementation for the next subtree shell folder object. On the other hand, if a namespace subtree shell folder object implementation of the ParseDisplayName method determines that the address is consistent with addresses in its namespace subtree, it generates a subtree-specific representation of the address, called a "PIDL", used to bind to and retrieve the contents of the address. The PIDL is returned to the implementation of the ParseDisplayName method for the shell hierarchy root object, and ultimately to the browser.

After receiving a PIDL identifying the addressed object from one of the namespace subtree shell folder objects, the browser uses the interface pointer to the implementation of the IShellFolder interface for that shell folder object to invoke a BindToObject method of the IShellFolder interface in order to retrieve the contents of the addressed object. The implementation of this method varies with the nature of the particular namespace subtree. For example, the implementation for the filesystem namespace subtree uses well-known techniques to retrieve the contents of the addressed file. Because of the relative speed of these retrieval techniques, retrievals from the filesystem are preferably scheduled synchronously, so that the retrieval completes before the BindToObject invocation returns. On the other hand, for the Internet subtree, the retrieval is preferably asynchronous, so that portions of the data, which is relatively slowly retrieved from the Internet address, can be displayed as it is received. BindToObject implementation for the Internet namespace subtree shell folder object preferably creates a URL moniker identifying the addressed object by invoking an IMoniker::ParseDisplayName method, and retrieves the contents of the object by binding to this created moniker by invoking a IMoniker::BindToObject method, specifying that this binding is to be performed asynchronously. The Internet namespace subtree implementation of the BindToObject method then returns to the browser.

In step 403, the browser invokes code to display the contents of the addressed object which have either been completely or partially received by this point. As part of step 403, the browser preferably first invokes a CreateViewObject method on the shell folder object for the namespace subtree containing the address in order to create a view object for the addressed object. This view object supports the IShellView interface for displaying the contents of the object. The CreateViewObject method returns an interface pointer to the IShellView interface of the created view object. The implementation of the CreateViewObject method for both the filesystem and Internet namespace subtrees preferably invoke code for a universal document viewer that generates in the created view object a display representation of the contents of the addressed object. The universal document viewer preferably has different modules for different document types, including web pages, filesystem directories and other folders, and more traditional documents such as text documents, word processing documents, and spreadsheet documents. At least the web page display module preferably contains logic for displaying contents on-the-fly as they are received asynchronously. After the view object has been created, the CreateViewObject method returns an interface pointer to the IShellView interface of the created view object. The browser uses this interface pointer to invoke a CreateViewWindow method of the view object to generate a window data structure that may be displayed by the operating system or user interface shell to display the contents of the view object generated by the universal viewer. The CreateViewWindow method returns a window pointer that may be used to display the created view window. The browser then uses the window handle to display the created view window by, for example, calling the SetWindowPos Windows® 95 API with the window handle. As a result, the contents of the namespace address received in step 401 are displayed, irrespective of the subtree of the namespace containing the address or the type of those contents. The namespace addresses whose contents can be displayed by the browser include the root of the shell hierarchy. This root is also called the "desktop".

Figure 6:
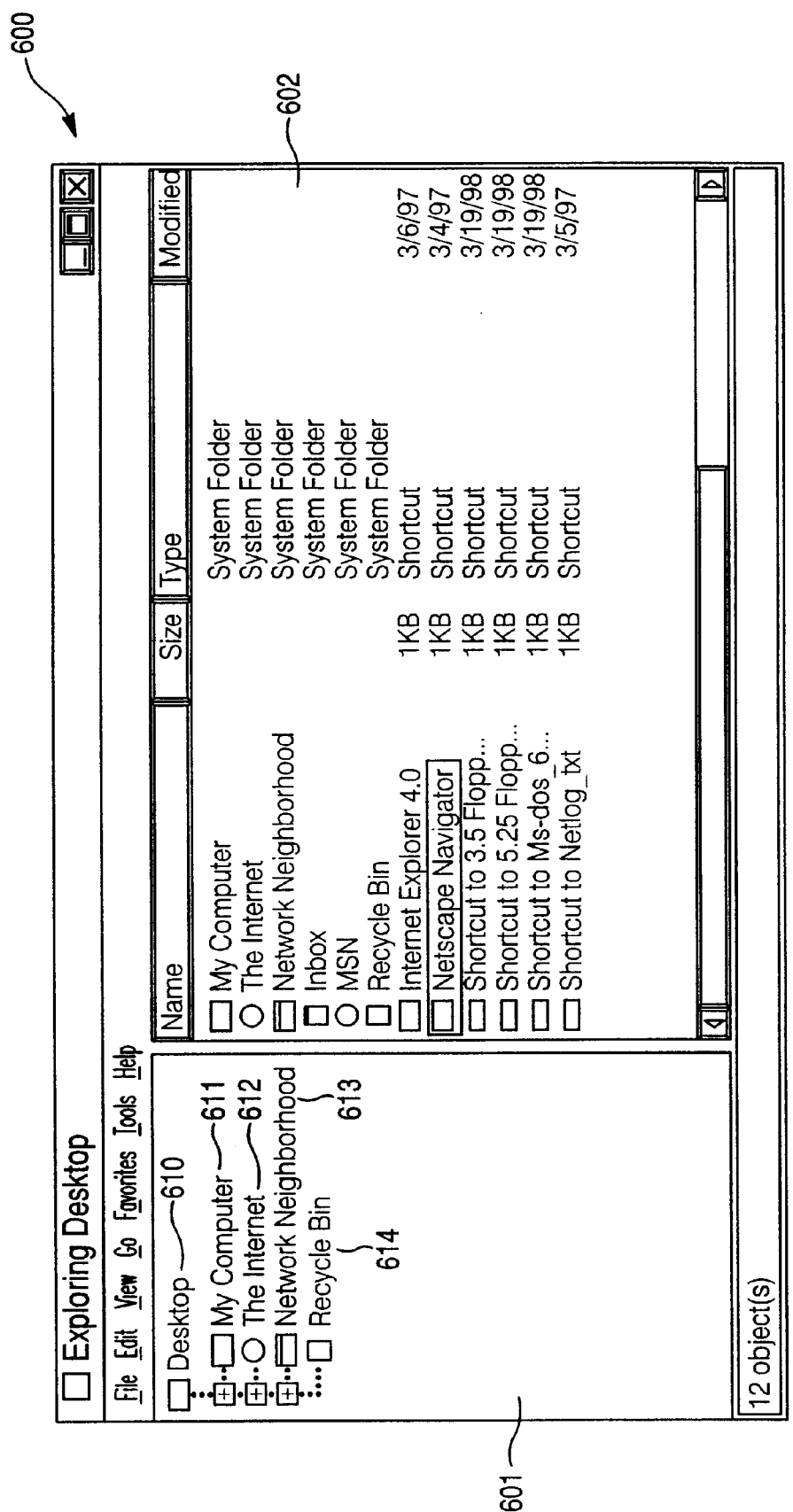
FIG. 6 is a screen diagram showing the browser displaying the contents of the root of the shell hierarchy, or desktop.

FIG. 6 is a screen diagram showing the browser displaying the contents of the root of the shell hierarchy, or desktop. The window displayed by the browser 600 contains a left navigation pane 601 and a right contents display pane 602. In alternative embodiments of the invention, the left navigation pane is omitted to include only the right contents display pane. Here, however, the left navigation pane may be used to select addresses within the namespace. The left navigation pane here displays the very top level of the namespace hierarchy. The root or desktop 610 is at the top of the hierarchy, and has four children in the hierarchy. The "My Computer" child 611 represents the local filesystem namespace subtree. The "The Internet" child 612 represents the Internet namespace subtree. The "Network Neighborhood" child 613 represents a namespace subtree for a distributed filesystem maintained in conjunction with other computers. Finally, the "Recycle Bin" child 614 represents a namespace subtree containing deleted objects that may still be recovered. The right contents display pane 602 displays the contents of the child hierarchy root, or desktop. These contents include the children of the root shown in the left pane, as well as other objects whose icons are displayed on the desktop of the user interface shell.

In order to generate this display, the browser performs the steps shown in FIG. 5. In the case of the address specifying the root of the shell hierarchy, the ParseDisplayName method of the shell folder object for the root of the shell hierarchy is itself able to identify the address. This implementation of ParseDisplayName therefore generates the PIDL for the address itself, and does not call the ParseDisplayName methods for the shell folder objects corresponding to its children. This shell folder object is further used to bind to the desktop object and create a view object. This view object is used to create a view window, which is displayed as right contents viewing pane 602.

Figure 7:
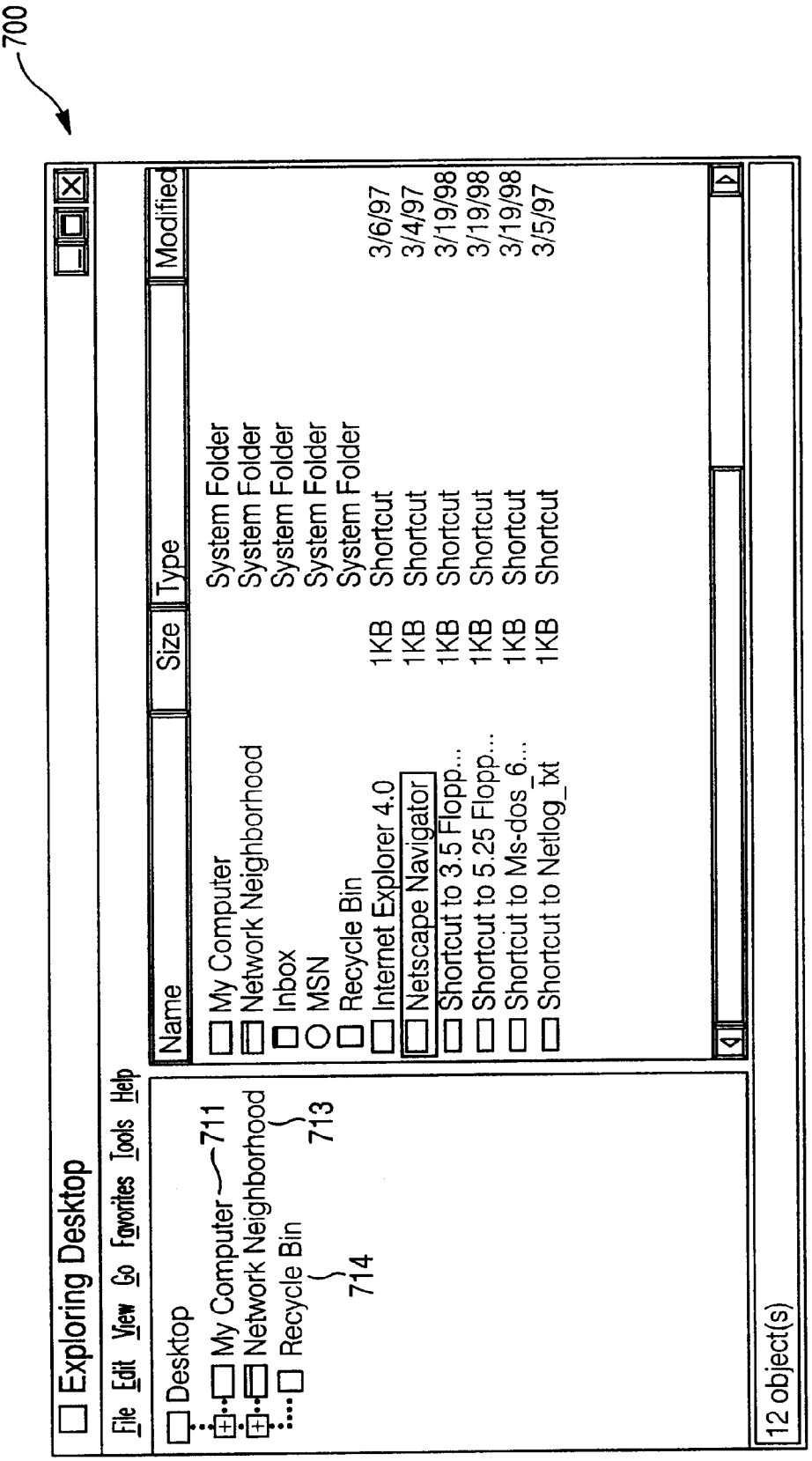
FIG. 7 is a display diagram showing the desktop for a namespace not including Internet addresses.

The desktop contents shown in FIG. 6 contrast with the desktop contents for a namespace that does not include Internet addresses. FIG. 7 is a display diagram showing the desktop for a namespace not including Internet addresses. It can be seen that, while the desktop has children "My Computer" 711, "Network Neighborhood" 713, and "Recycle Bin" 714, the desktop does not have a child for "The Internet" corresponding to the Internet subtree. Thus, in the namespace not including Internet addresses, Internet addresses may not be displayed or resolved in the same manner as filesystem addresses or other shell addresses.

Figure 8:
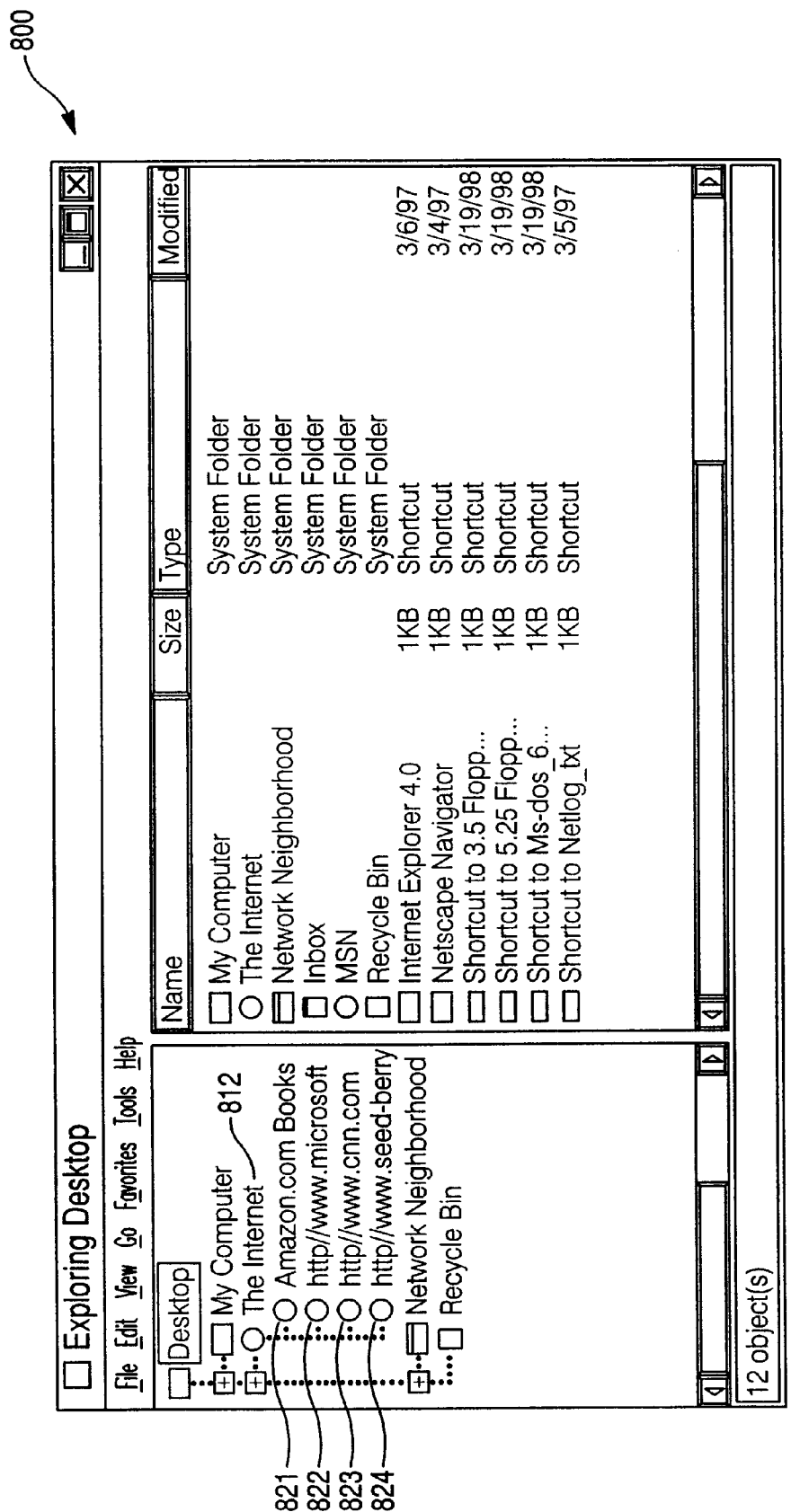
FIG. 8 is a display diagram showing that the "the Internet" child of the desktop can be expanded to show specific Internet addresses.

FIG. 8 is a display diagram showing that the "The Internet" child of the desktop can be expanded to show specific Internet addresses. FIG. 8 shows that the "The Internet" child 812 can be expanded to show Internet addresses 821, 822, 823, and 824. In this case, each of these Internet addresses corresponds to a web page document. Alternatively, any of these addresses can correspond to documents of other types.

Figure 9:
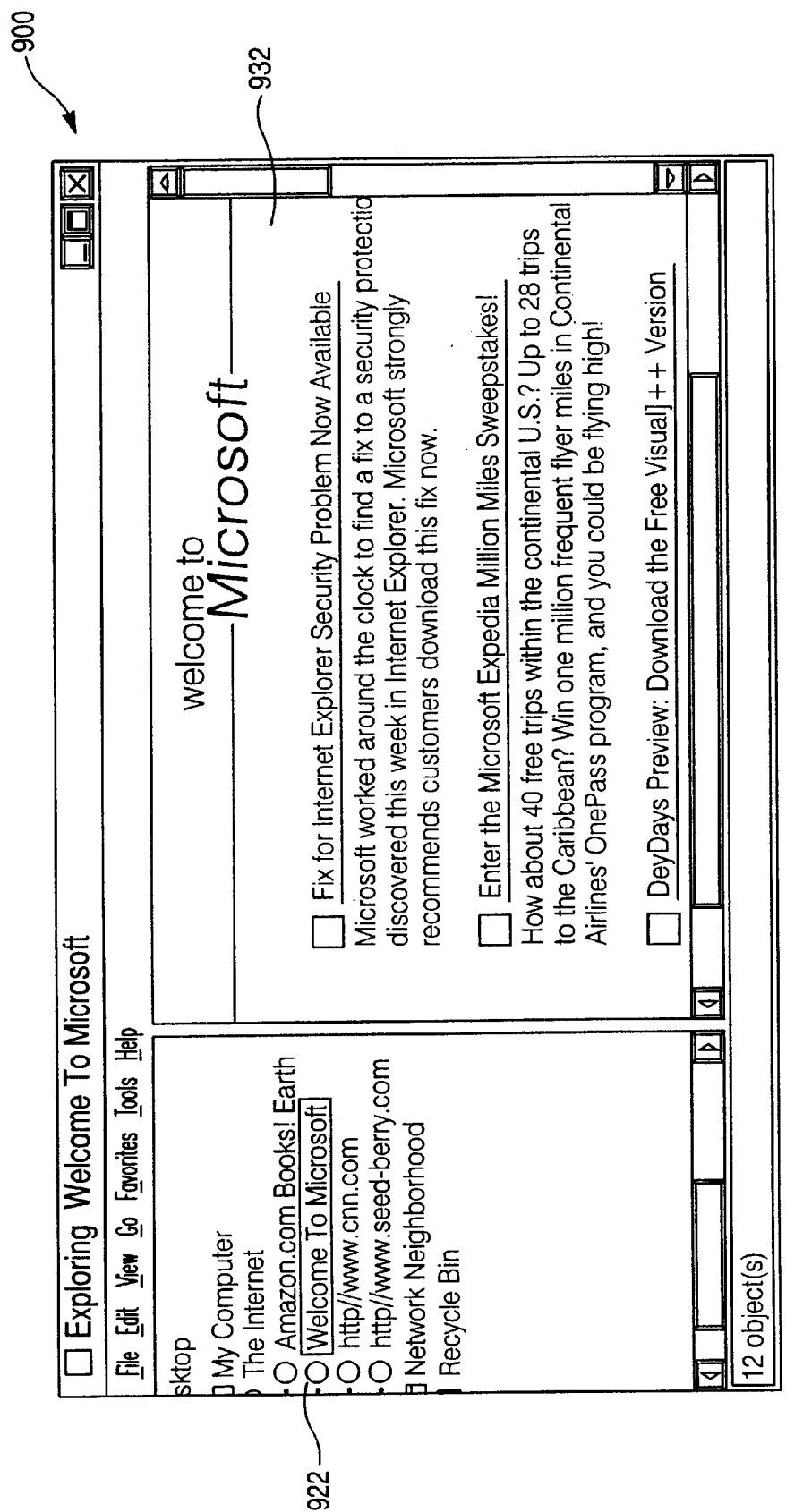
FIG. 9 is a display diagram showing the display of a web page by the browser.

FIG. 9 is a display diagram showing the display of a web page by the browser. The user has selected a "Welcome To Microsoft" Internet address 922. The child of "The Internet" 922 actually display as a friendly display name derived from the contents of a web page, replacing the actual Internet address in the display in order to make the display more comprehensible to the user. The child actually corresponds to the Internet address "http://www.microsoft.com". By selecting the child corresponding to this address, the user submits the Internet address to the browser in order to display its contents. The browser therefore applies the steps shown in FIG. 4 to display the contents 932 of the web page stored at this Internet address. The implementation of ParseDisplayName for the shell folder object corresponding to the Internet namespace subtree is able to recognize the Internet address, and returns a PIDL for the Internet address. This shell folder object is then used to bind to the web page object via the Internet, and retrieve its contents asynchronously. Its implementation of the CreateViewObject method is used to invoke the universal document viewer, which in turn invokes the display module for displaying web page contents. This module translates the HTML web page source information retrieved via the Internet into the web page display 932 using a variety of HTML display techniques. Web pages constructed in a source language other than HTML may be displayed by providing a universal document viewer display module for source documents of that type.

Figure 10:
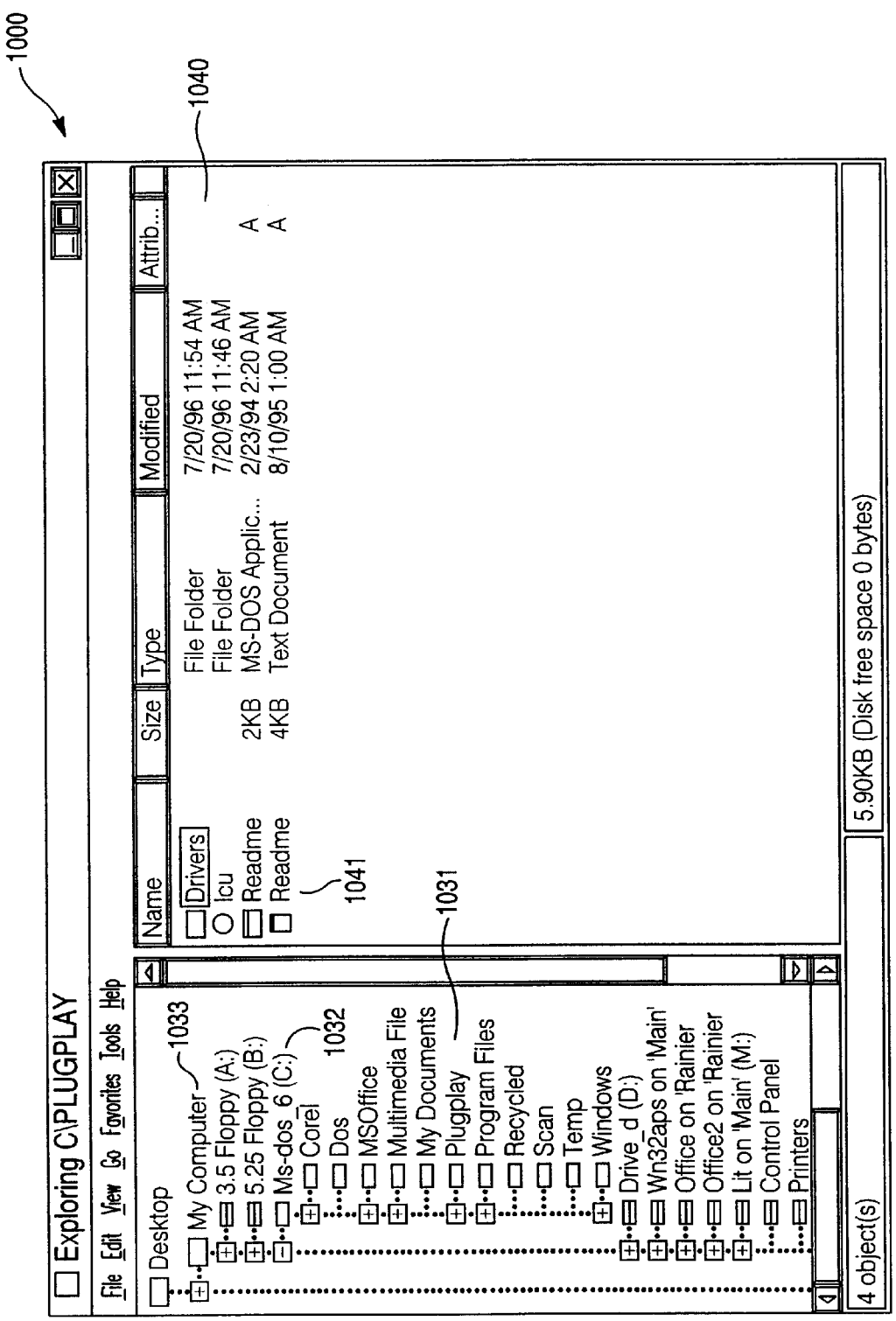
FIG. 10 is a display diagram showing the use of the universal browser to display the contents at a filesystem address.

The universal browser may also be used to display the contents at filesystem addresses. FIG. 10 is a display diagram showing the use of the universal browser to display the contents at a filesystem address. The window 1000 is displayed by the browser in response to receiving the name space address "c:\plugplay". This address is displayed in the left navigation pane as child "Plugplay" 1031, which is a child of "Ms-dos_6 (c:)" 1032, which is in turn a child of "My Computer" 1033, which represents the local filesystem namespace subtree. In this case, the ParseDisplayName method of the desktop shell folder object calls that of the filesystem subtree, which calls that of the "Ms-dos_6 (c:)", which in turn calls that of the "Plugplay" folder. It is the ParseDisplayName method for the "Plugplay" folder that returns a PIDL for the address, and whose BindToObject method is called to bind to the received address, and its CreateViewObject method that is invoked to create a view object for displaying the contents of the folder.

Figure 11:
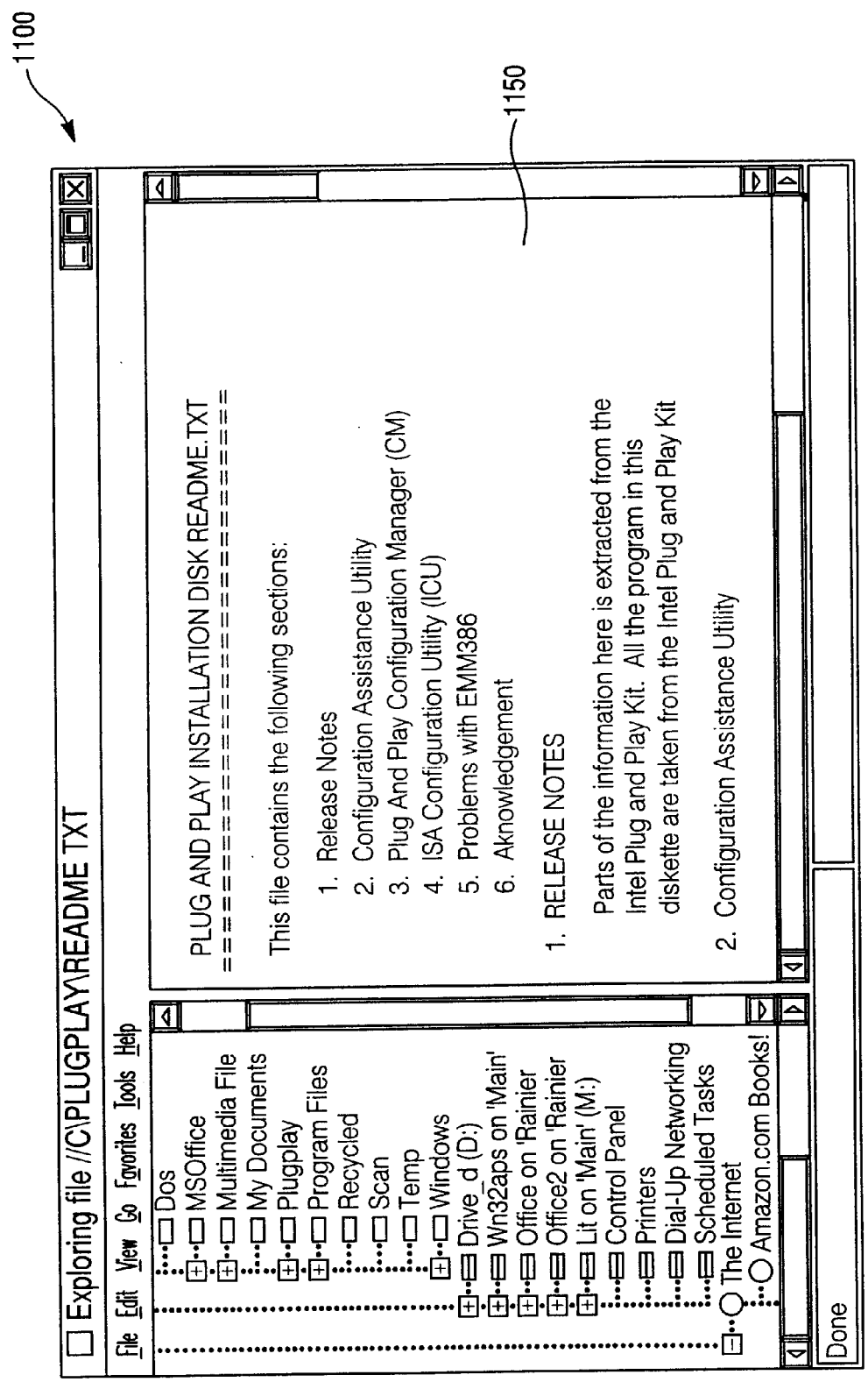
FIG. 11 is a screen diagram showing the browser displaying the contents of a text document.

As the universal browser can display the contents of many objects, the user selects the "Readme" text document object 1041 from among the contents of the "plugplay" folder. This is interpreted by the browser as a request to display the contents at this address. The "Readme" text document is bound to, and displayed by universal document viewer using a display module for displaying text documents. FIG. 11 is a screen diagram showing the browser displaying the contents of the "Readme" text document. The window 1100 displayed by the browser displays in its right contents display plane 1150 the contents of the selected "Readme" text document, created by the universal document viewer using a text document display module.

Figure 12A:
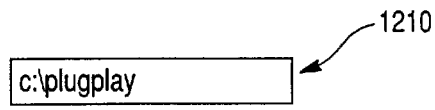
FIGS. 12A and 12B are data structure diagrams illustrating the uniform shortcuts facilitated by the common namespace.
Figure 12B:

By incorporating both filesystem and Internet addresses in a common namespace, the present invention facilitates the use of uniform reference objects, or "shortcuts," for storing references to the filesystem and Internet addresses within the filesystem. Conventionally, because filesystem and Internet addresses were part of separate namespaces, shortcuts or references to these objects had to be differentiated by address type. That is, filesystem addresses were stored in the filesystem as a first type of shortcut, while Internet addresses were stored in the filesystem as a second type of shortcut. FIGS. 12A and 12B illustrate the uniform shortcuts facilitated by the common namespace. FIG. 12A shows a shortcut 1210 to a filesystem address, "c:\plugplay". FIG. 12B shows a shortcut 1220 to an Internet address, "http://www.microsoft.com". These shortcuts have the same format, and may both be dereferenced applying them to the common namespace described above. Shortcuts to both filesystem and Internet addresses may therefore be stored and processed in the same manner.

Figure 13:
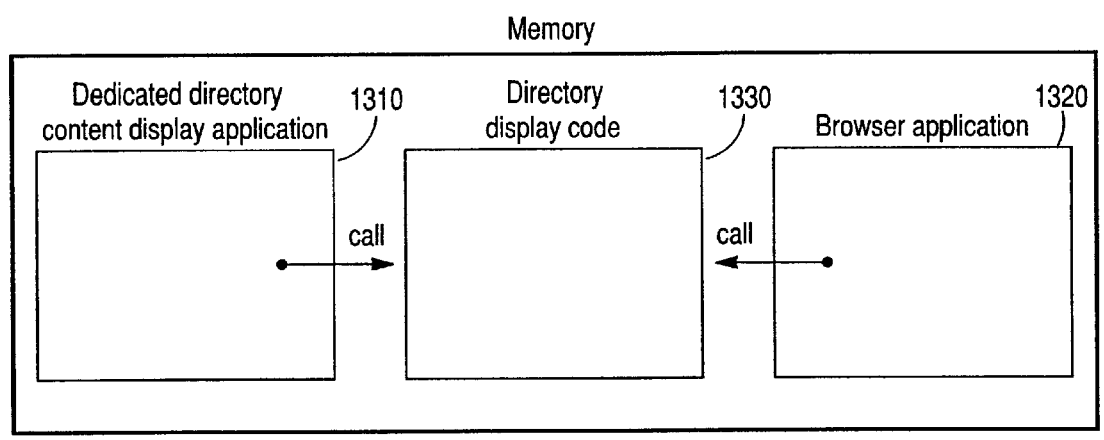
FIG. 13 is a memory diagram illustrating the sharing of code for displaying the contents of a directory.

The shell preferably utilizes a body of code for displaying the contents of a directory in an application program dedicated to displaying the contents of a directory. As one aspect of the invention, the browser application preferably calls this same body of code in order to display the contents of a directory when the browser receives a request to browse an address specifying a directory, such as "c:\plugplay". FIG. 13 is a memory diagram illustrating the sharing of code for displaying the contents of a directory. FIG. 13 shows an application program 1310 and a browser application 1320 both calling a single body of directory display code 1330. As an example, in the Microsoft® Windows® 95 operating system produced by Microsoft Corporation of Redmond, Wash., a dedicated Windows Explorer application may be used to display the contents of a directory. The body of shell code called by the Windows Explorer in the Microsoft® Windows® 95 operating system, and its incorporation in an application such as the browser application of the invention, is discussed in detail in U.S. patent application Ser. No. 08/356,081 entitled "Method and System for Accessing Shell Folder Capabilities by an Application Program," which is hereby incorporated by reference.

Figure 14:
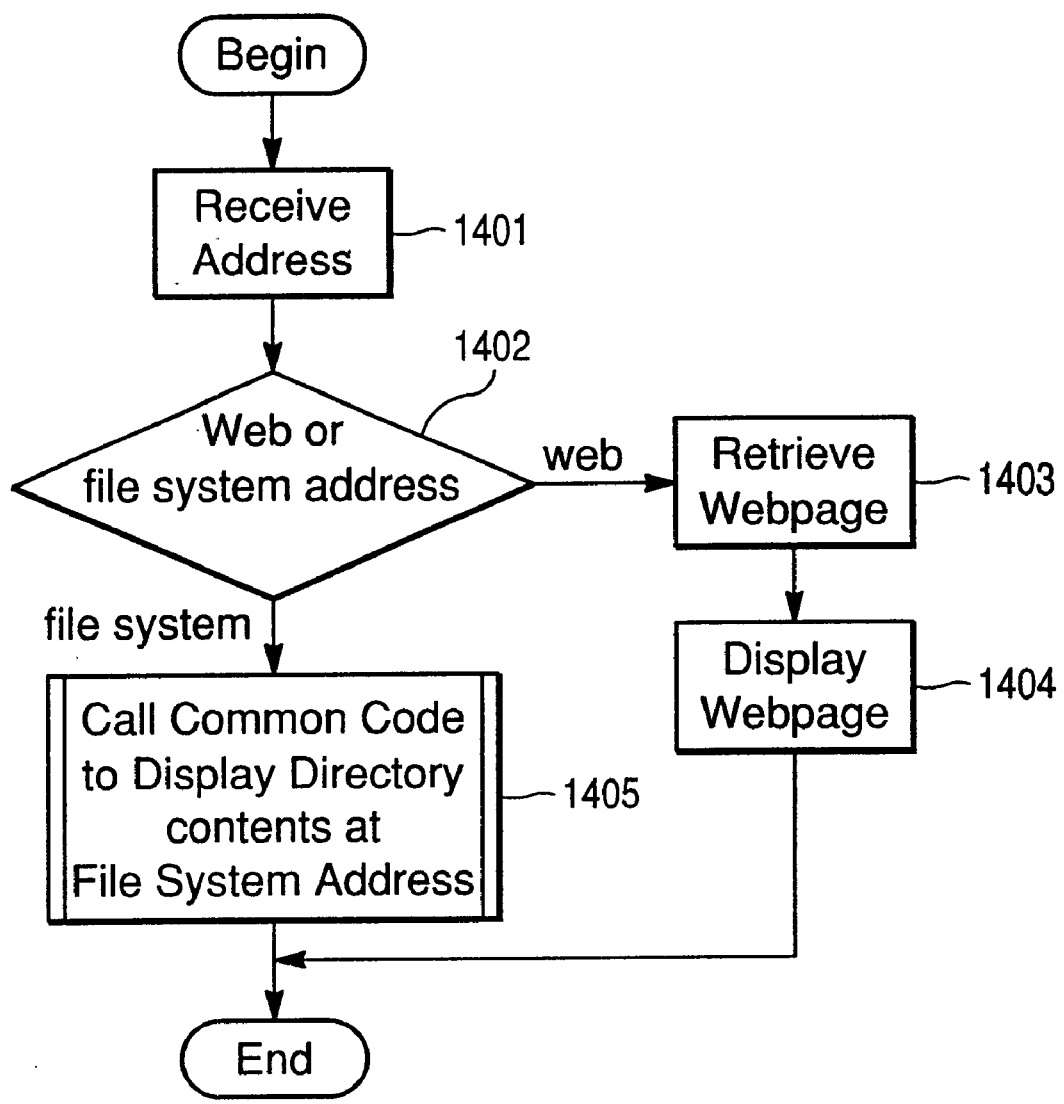
FIG. 14 is a flow diagram showing the steps preferably performed by the browser application to display the contents of an address.

FIG. 14 is a flow diagram showing the steps preferably performed by the browser application 1320 to display the contents of an address. In step 1401, the browser receives an address for an item to display. The address may be either a filesystem address or a web address. In step 1402, if the received address is a web address, then the browser continues in step 1403, else if the address is a filesystem address, then the browser continues in step 1405. In step 1403, the browser uses well-known techniques to retrieve the web page at the web address via the Internet. In step 1404, the browser uses well-known techniques to display the retrieved web page data on the display device. After step 1404, these steps conclude. In step 1405, the browser calls the common code for displaying directory contents at the filesystem address received in step 1401. These steps then conclude.

In an additional preferred embodiment, when the common code is used to display the contents of a directory in the browser application, the user may manipulate the contents of the directory at least in some of the ways available in the application dedicated to displaying directory contents. For example, the user may preferably move, rename, delete, or launch files in the directory and create new folders or files in the directory under the control of the common code.

Figure 15:
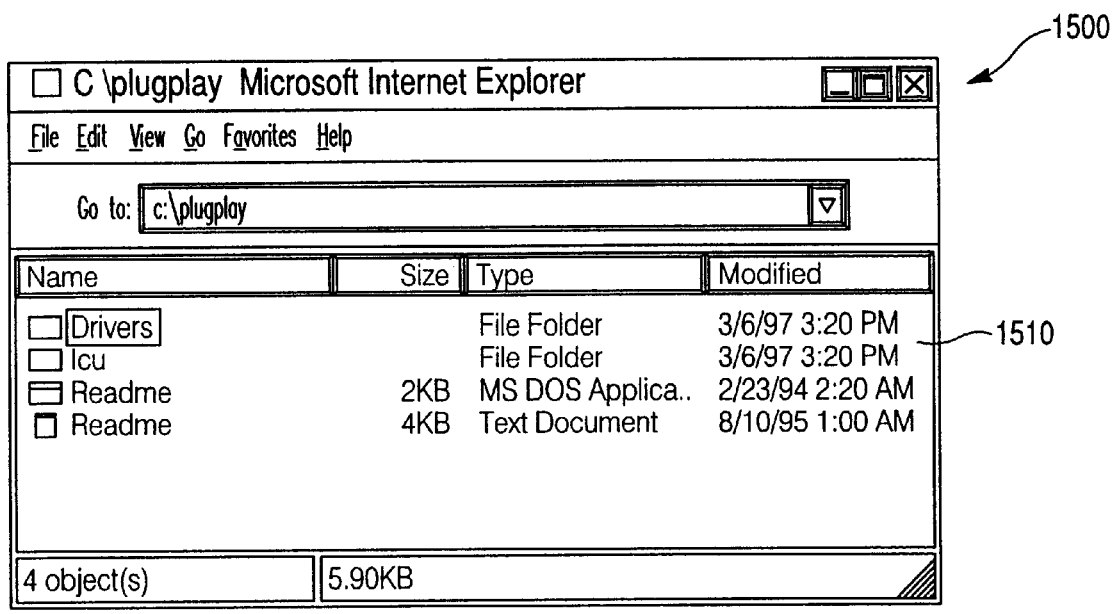
FIG. 15 is a screen diagram showing the window preferably displayed by the browser when it receives a filesystem address.

FIG. 15 is a screen diagram showing the window preferably displayed by the browser when it receives a filesystem address. The browser displays window 1500 when it receives the filesystem address "c:\plugplay". The browser calls the common code for displaying directory contents in step 1405 (FIG. 14) in order to display subwindow 1510 containing information about the contents of the directory at "c:\plugplay". Subwindow 1510 displayed by the browser is produced by the same code as, and appears similar to, a subwindow of a window produced by an application dedicated to displaying the contents of a directory.

Figure 1:
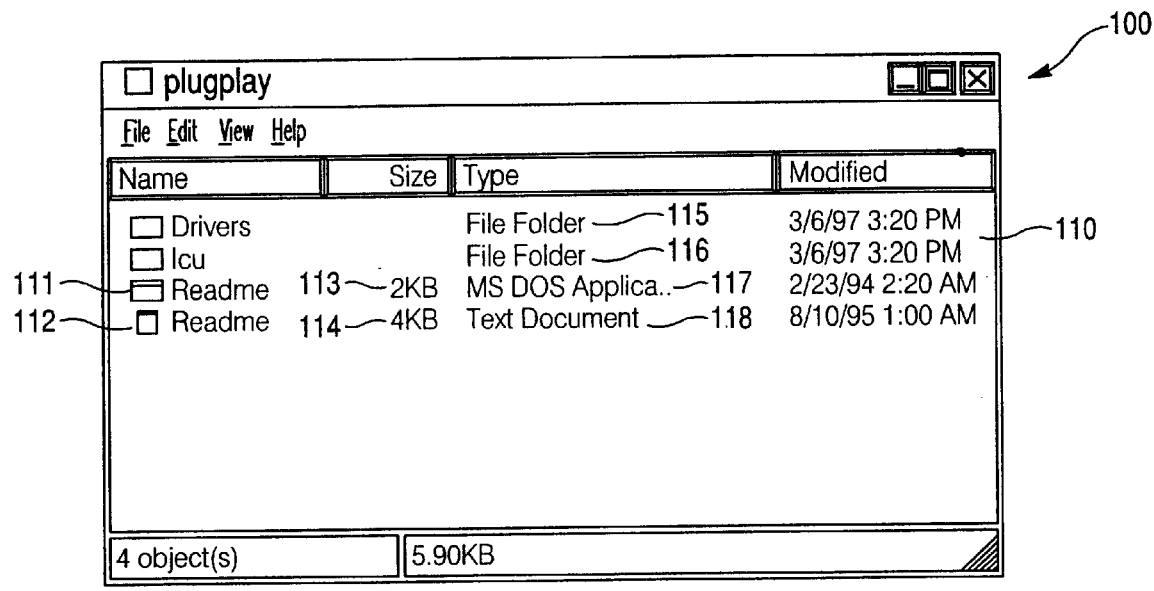
FIG. 1 is a screen diagram showing a window displayed by a filesystem viewer application called the Windows Explorer.
Figure 2:
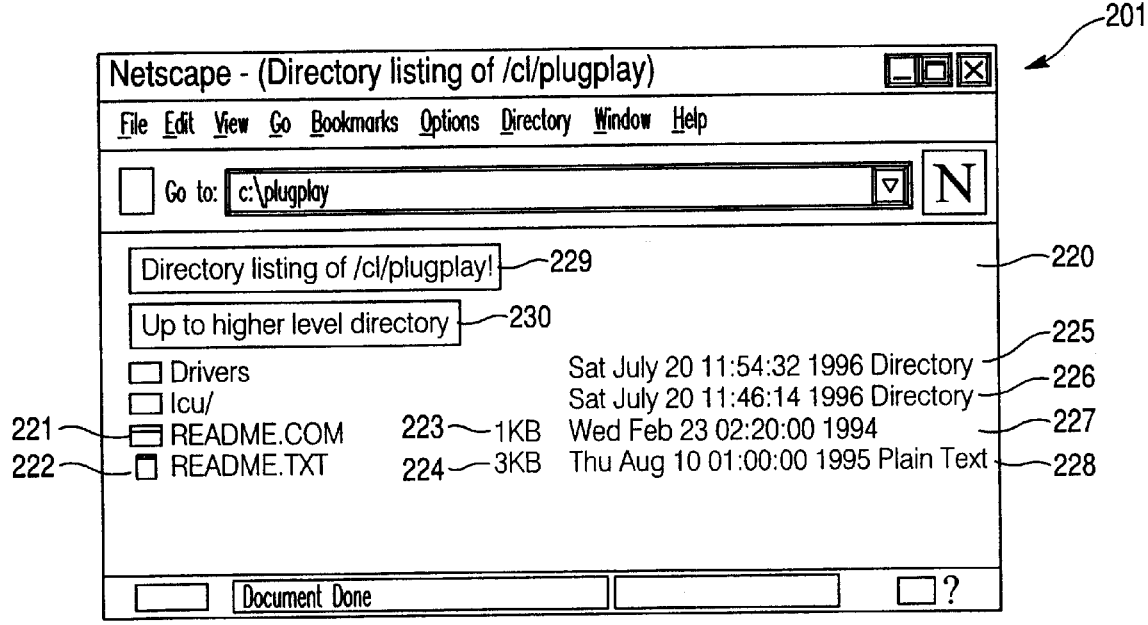
FIG. 2 is a screen diagram that shows the contents of the same directory displayed by a conventional web browser application.

FIG. 1, discussed above, is a screen diagram showing a window displayed by a dedicated application for displaying the contents of a directory. Window 101 is displayed by the dedicated application, and contains subwindow 110. Subwindow 110, like subwindow 1510, is generated by calling common code for displaying directory contents. The appearance and operation of the subwindows is therefore very similar, allowing users to interact with them in a consistent manner.

While this invention has been shown and described with reference to preferred embodiments, it will be understood by those skilled in the art that various changes or modifications in form and detail may be made without departing from the scope of the invention. For example, uniform references may represent filesystem and Internet addresses differently than discussed above, and may contain additional data besides the actual address. Further, while local filesystem and Internet addresses are the shell hierarchy subtrees most extensively described above, the shell hierarchy may preferably contain many other types of subtrees corresponding to resources available from or through the computer system.

We claim:

1. A computer system for displaying arbitrary content stored in an arbitrary location comprising in combination:
   (a) a processor;
   (b) a local filesystem; and
   (c) a memory having stored thereon:
      (i) a common namespace structure representing both local filesystem addresses and world wide web addresses;
      (ii) a universal document viewer program having a plurality of modules capable of being executed by the processor, each module capable of displaying data of a particular type, and
      (iii) a system component executed on the processor to receive an address, utilize the common namespace structure to resolve the address to represent a point either in the local filesystem or in the world wide web, retrieve data from the point, and utilize one of the modules in the universal document viewer program to display the retrieved data.

2. The computer system of claim 1 wherein the common namespace structure is provided as part of a shell resource hierarchy that hierarchically organizes resources available on or via the computer system.

3. The computer system of claim 1 wherein the common namespace structure is provided as part of a shell resource hierarchy, wherein local filesystem addresses are represented in a first subtree and world wide web addresses are represented in a second subtree.

4. The computer system of claim 3 wherein the common namespace structure comprises a plurality of functions for defining contents of any folder in the first or second subtrees.

5. The computer system of claim 1 wherein the universal document viewer program has a module capable of displaying world wide web pages.

6. The computer system of claim 5 wherein the module capable of displaying world wide web pages comprises logic for displaying contents on-the-fly as the contents are received.

7. The computer system of claim 1 wherein the universal document viewer program has a module capable of displaying local filesystem files.

8. The computer system of claim 1 wherein the universal document viewer program has a module capable of displaying text documents.

9. The computer system of claim 1 wherein the universal document viewer program has a module capable of displaying word processing documents.

10. The computer system of claim 1 wherein the universal document viewer program has a module capable of displaying spreadsheet documents.

11. A method for retrieving and displaying arbitrary content stored in an arbitrary location, comprising the steps of:
   (a) receiving an address corresponding to data;
   (b) invoking a parse method to identify, using a registry, a location and a format of the data corresponding to the received address, wherein the location may comprise a local computing device, a computing device on a network, and a computing device over an Internet, and wherein the data corresponding to the received name may be one of a plurality of formats;
   (c) invoking a bind method to retrieve data stored at the identified location; and
   (d) invoking a display method that corresponds to the format of the retrieved data to display the retrieved data,
   wherein the parse, bind, and display methods are universal methods accessible by one or more application programs.

12. The method of claim 11, wherein the steps of invoking are performed by a web browser application program.

13. The method of claim 11, wherein the step of invoking a parse method uses a shell extension table to identify the location and the format of the data corresponding to the received address.

14. The method of claim 13, wherein the shell extension table includes a "my computer" subtee and an "internet" subtree.

15. The method of claim 11, wherein the step of invoking a bind method includes the step of retrieving the data synchronously.

16. The method of claim 11, wherein the step of invoking a bind method includes the step of retrieving the data asynchronously.

17. The method of claim 11, wherein the step of invoking a display method includes the step of invoking the display method corresponding to web page data.

18. The method of claim 11, wherein the step of invoking a display method includes the step of invoking the display method corresponding to local filesystem data.

19. The method of claim 11, wherein the step of invoking a display method includes the step of invoking the display method corresponding to text document data.

20. The method of claim 11, wherein the step of invoking a display method includes the step of invoking the display method corresponding to word processing document data.

21. The method of claim 11, wherein the step of invoking a display method includes the step of invoking the display method corresponding to spreadsheet document data.

22. The method of claim 11, wherein the step of invoking a display method includes the step of displaying contents on-the-fly as they are received.

23. A computer-readable medium whose contents cause a computer system to retrieve and display arbitrary content stored in an arbitrary location by performing the steps of:
under control of a single system component accessible by one or more application programs,
(a) receiving a name corresponding to data;
(b) invoking a parse method to resolve the received name thereby identifying a location corresponding to the received name;
(c) retrieving data from the location, wherein the location may be either the computer system or a computer system located over the Internet, and wherein the data may be one of a plurality of formats; and
(d) submitting the retrieved data to a universal data display module for display;
under control of a universal data display module,
(a) identifying a format of the retrieved data;
(b) identifying a display routine within the universal data display module capable of displaying data of the identified format; and
(c) invoking the display routine to display the retrieved data.

24. The computer-readable medium of claim 23, wherein the step of identifying a format identifies the retrieved data as a web page.

25. The computer-readable medium of claim 23, wherein the step of identifying a format identifies the retrieved data as a local filesystem file.

26. The computer-readable medium of claim 23, wherein the universal data display module is a web browser.

27. A method in a computer system for displaying a data file using a universal document display mechanism, comprising the steps of:
(a) receiving the data file in the universal document display mechanism for display, wherein the universal document display mechanism has a first program module for displaying a world wide web page and a second program module for displaying content from a local filesystem file;
(b) determining whether the data file is a world wide web page or identifies content from local filesystem file;
(c) if the data file is a world wide web page, invoking the first program module from within the universal document display mechanism to display the received data file in its intended form as a world wide web page; and
(d) if the data file identifies content of a local filesystem file, invoking a second program module from within the universal document display mechanism to display the received data file in its intended form as a local filesystem file.

28. A method in a computer for utilizing common code to display contents of a directory, comprising the steps of:
in an application program dedicated to displaying contents of local filesystem directories, wherein the application program is capable of displaying in a single shell at least one filesystem address and at least one world wide web address of a common namespace structure,
(a) receiving a first request to display the contents of a first directory, wherein the contents of the first directory are files of a local filesystem;
(b) in response to receiving the first request, executing a common block of code for displaying the contents of the first directory; and
in an application program capable of retrieving and displaying the contents of world wide web pages,
(a) receiving a second request to display the contents of a second directory, wherein the contents of the second directory are files that are accessable via the world wide web;
(b) in response to receiving the second request, executing the common block of code for displaying the contents of a filesystem directory to display the contents of the second directory.

29. The method of claim 28, further including the steps of:
in an application program capable of retrieving and displaying the contents of world wide web pages,
(c) receiving a command to manipulate the contents of the second directory when the common block of code is executed in response to the second request; and
(d) manipulating the contents of the second directory in accordance with the received command under the control of the common block of code.

30. The method of claim 29, wherein the step of receiving a command includes the step of receiving a command to move an object in the second directory to a different directory.

31. The method of claim 29, wherein the step of receiving a command includes the step of receiving a command to rename an object in the second directory.

32. The method of claim 29, wherein the step of receiving a command includes the step of receiving a command to delete an object in the second directory.

33. The method of claim 29, wherein the step of receiving a command includes the step of receiving a command to open an object in the second directory.

34. The method of claim 29, wherein the step of receiving a command includes the step of receiving a command to create an object in the second directory.

35. The method of claim 34, wherein the step of receiving a command to create an object in the second directory includes the step of receiving a command to create an embedded folder in the second directory.

36. A computer-readable medium whose contents cause a computer system perform the steps recited in claim 28.

37. A computer system for utilizing common code to display contents of a directory, comprising;
(a) a processor;
(b) a storage device; and
(c) a memory having stored therein:
(i) a first application program executable on the processor, the first application program dedicated to displaying contents of local filesystem directories,
(ii) a second application program executable on the processor, the second application program capable of retrieving and displaying contents of world wide web pages, and
(iii) a universal document display mechanism executable on the processor capable of being called by both the first and second applications to display the contents of specified directories on the storage device.

* * * * *

UNITED STATES PATENT AND TRADEMARK OFFICE
CERTIFICATE OF CORRECTION

PATENT NO.    : 6,678,724 B2                                              Page 1 of 1
DATED         : January 13, 2004
INVENTOR(S)   : Satoshi Nakajima It is certified that error appears in the above-identified patent and that said Letters Patent is
hereby corrected as shown below:

Column 1,
Line 4, above "TECHNICAL FIELD" insert -- This patent application is a continuation
of U.S. Patent Application Serial No. 08/816,449 ("Common Namespace For Internet
And Local Filesystem Objects"), filed March 12, 1997, abandoned, for which priority is
claimed. This patent application is incorporated herein by reference in its entirety." --

Signed and Sealed this

Fifth Day of July, 2005

JON W. DUDAS
*Director of the United States Patent and Trademark Office*